(12) United States Patent
Dent

(10) Patent No.: US 10,033,302 B2
(45) Date of Patent: Jul. 24, 2018

(54) ROTARY SOLAR CONVERTER

(71) Applicant: Koolbridge Solar, Inc., Wrightsville Beach, NC (US)

(72) Inventor: Paul Wilkinson Dent, Pittsboro, NC (US)

(73) Assignee: Koolbridge Solar, Inc., Wrightsville Beach, NC (US)

( * ) Notice: Subject to any disclaimer, the term of this patent is extended or adjusted under 35 U.S.C. 154(b) by 753 days.

(21) Appl. No.: 14/473,557

(22) Filed: Aug. 29, 2014

(65) Prior Publication Data

US 2016/0065090 A1   Mar. 3, 2016

(51) Int. Cl.
| | |
|---|---|
| *H02M 7/54* | (2006.01) |
| *H02K 47/26* | (2006.01) |
| *H02P 25/22* | (2006.01) |
| *H02K 17/02* | (2006.01) |
| *H02K 17/42* | (2006.01) |

(52) U.S. Cl.
CPC ............. *H02M 7/54* (2013.01); *H02K 47/26* (2013.01); *H02P 25/22* (2013.01); *H02K 17/02* (2013.01); *H02K 17/42* (2013.01)

(58) Field of Classification Search
CPC ......... H02M 7/54; H02K 47/26; H02K 17/02; H02K 17/42; H02P 25/22; H02P 9/14; H02P 9/30
USPC .................................. 310/112–114, 179–210
See application file for complete search history.

(56) References Cited

U.S. PATENT DOCUMENTS

| | | |
|---|---|---|
| 3,805,141 A | 4/1974 | Pompa, Jr. et al. |
| 3,958,174 A | 5/1976 | Studtmann et al. |
| 4,084,220 A | 4/1978 | Akamatsu |
| 4,180,853 A | 12/1979 | Scorso, Jr. et al. |
| 4,204,268 A | 5/1980 | Vivirito |
| 4,320,449 A | 3/1982 | Carroll |
| 4,803,611 A | 2/1989 | Sashida et al. |
| 4,882,120 A | 11/1989 | Roe et al. |
| 5,226,077 A | 7/1993 | Lynn et al. |
| 5,270,636 A | 12/1993 | Lafferty |
| 5,373,433 A | 12/1994 | Thomas |
| 5,424,894 A | 6/1995 | Briscall et al. |
| 5,479,086 A | 12/1995 | Konstanzer |
| 5,625,276 A | 4/1997 | Scott et al. |
| 5,714,869 A | 2/1998 | Tamechika et al. |

(Continued)

FOREIGN PATENT DOCUMENTS

| | | |
|---|---|---|
| CN | 101350569 A | 1/2009 |
| CN | 202444440 U | 9/2012 |

(Continued)

OTHER PUBLICATIONS

Intersil, George E. Danz, HIP4080, 80V High Frequency H-Bridge Driver, Application Note. AN9324.4, Mar. 2003.

*Primary Examiner* — Naishadh Desai
(74) *Attorney, Agent, or Firm* — Coats & Bennett, PLLC

(57) ABSTRACT

An advantageous method of converting solar energy from a photovoltaic array into alternating current for feeding into the electricity grid is described based on the use of an inventive rotary machine. The inventive rotary machine has a rotor and a set of stator coils which are excited in a first mode by a polyphase current derived from the solar array and simultaneously in a second, orthogonal mode by a polyphase voltage derived from the electricity grid.

17 Claims, 13 Drawing Sheets

(56) References Cited

U.S. PATENT DOCUMENTS

| | | |
|---|---|---|
| 5,726,505 A | 3/1998 | Yamada et al. |
| 5,930,128 A | 7/1999 | Dent |
| 5,991,645 A | 11/1999 | Yuen et al. |
| 6,051,954 A | 4/2000 | Nagao et al. |
| 6,154,379 A | 11/2000 | Okita |
| 7,057,485 B2 | 6/2006 | Preusse et al. |
| 7,082,040 B2 | 7/2006 | Raddi et al. |
| 7,138,730 B2 | 11/2006 | Lai |
| 7,474,016 B2 | 1/2009 | Wang et al. |
| 8,891,211 B2 | 11/2014 | Dent |
| 8,937,822 B2 | 1/2015 | Dent |
| 9,455,645 B1 | 9/2016 | Zhou et al. |
| 2002/0047455 A1 | 4/2002 | Dhyanchand et al. |
| 2003/0094929 A1* | 5/2003 | Pendell ............... H02K 17/42 322/44 |
| 2003/0094931 A1 | 5/2003 | Renyolds |
| 2003/0179063 A1 | 9/2003 | Preusse et al. |
| 2004/0100149 A1 | 5/2004 | Lai |
| 2005/0001598 A1 | 1/2005 | Belokon et al. |
| 2005/0056021 A1 | 3/2005 | Belokon et al. |
| 2005/0073292 A1 | 4/2005 | Hastings et al. |
| 2005/0180083 A1 | 8/2005 | Takahara et al. |
| 2006/0158037 A1 | 7/2006 | Danley et al. |
| 2007/0095062 A1 | 5/2007 | Chertok |
| 2007/0292724 A1 | 12/2007 | Gilchrist |
| 2009/0161392 A1 | 6/2009 | Zhang et al. |
| 2009/0184706 A1 | 7/2009 | Duric et al. |
| 2009/0206666 A1 | 8/2009 | Seller et al. |
| 2010/0064424 A1 | 3/2010 | Hsu et al. |
| 2011/0037600 A1 | 2/2011 | Takehara et al. |
| 2011/0043160 A1 | 2/2011 | Serban |
| 2011/0090607 A1 | 4/2011 | Luebke et al. |
| 2011/0140520 A1 | 6/2011 | Lee |
| 2011/0285354 A1 | 11/2011 | Iwasa |
| 2011/0301772 A1 | 12/2011 | Zuercher et al. |
| 2012/0007459 A1 | 1/2012 | Mondal et al. |
| 2012/0048325 A1 | 3/2012 | Matsuo et al. |
| 2012/0049637 A1 | 3/2012 | Teichmann et al. |
| 2012/0112557 A1 | 5/2012 | Sager |
| 2012/0242145 A1 | 9/2012 | Espeut, Jr. |
| 2012/0281444 A1 | 11/2012 | Dent |
| 2013/0057997 A1 | 3/2013 | Dent |
| 2013/0058144 A1 | 3/2013 | Hiramatsu et al. |
| 2013/0070494 A1 | 3/2013 | Rotzoll |
| 2013/0181655 A1 | 7/2013 | Yokoyama et al. |
| 2013/0181703 A1 | 7/2013 | Ausserlechner |
| 2013/0245614 A1 | 9/2013 | Seebruch |
| 2013/0320929 A1 | 12/2013 | Walker et al. |
| 2014/0062206 A1 | 3/2014 | Bryson |
| 2014/0084687 A1 | 3/2014 | Dent |
| 2014/0153303 A1 | 6/2014 | Potharaju |
| 2014/0266289 A1 | 9/2014 | Della Sera et al. |
| 2015/0008748 A1 | 1/2015 | Deboy et al. |
| 2015/0043110 A1 | 2/2015 | Dent |
| 2015/0217656 A1 | 8/2015 | Loftus et al. |
| 2015/0229131 A1 | 8/2015 | Gerhardinger |
| 2015/0288225 A1 | 10/2015 | Dent |
| 2015/0295413 A1 | 10/2015 | Dent |
| 2015/0318796 A1 | 11/2015 | Dent |
| 2015/0349708 A1 | 12/2015 | Moslehi |
| 2016/0036235 A1 | 2/2016 | Getsla |
| 2016/0224083 A1 | 8/2016 | Dent et al. |
| 2016/0226560 A1 | 8/2016 | Dent |
| 2016/0261226 A1 | 9/2016 | Hamilton et al. |
| 2016/0276837 A1 | 9/2016 | Manjrekar |
| 2017/0346413 A1 | 11/2017 | Dent |
| 2018/0006601 A1 | 1/2018 | Dent |
| 2018/0026550 A1 | 1/2018 | Dent |

FOREIGN PATENT DOCUMENTS

| | | | |
|---|---|---|---|
| EP | 2544354 A2 | 1/2013 | |
| EP | 2698894 A2 | 2/2014 | |
| GB | 1433402 A | 4/1976 | |
| WO | 2012140495 A2 | 10/2012 | |
| WO | WO 2012140495 A2 * | 10/2012 | ............. H02K 47/20 |
| WO | 2016204830 A1 | 12/2016 | |

\* cited by examiner

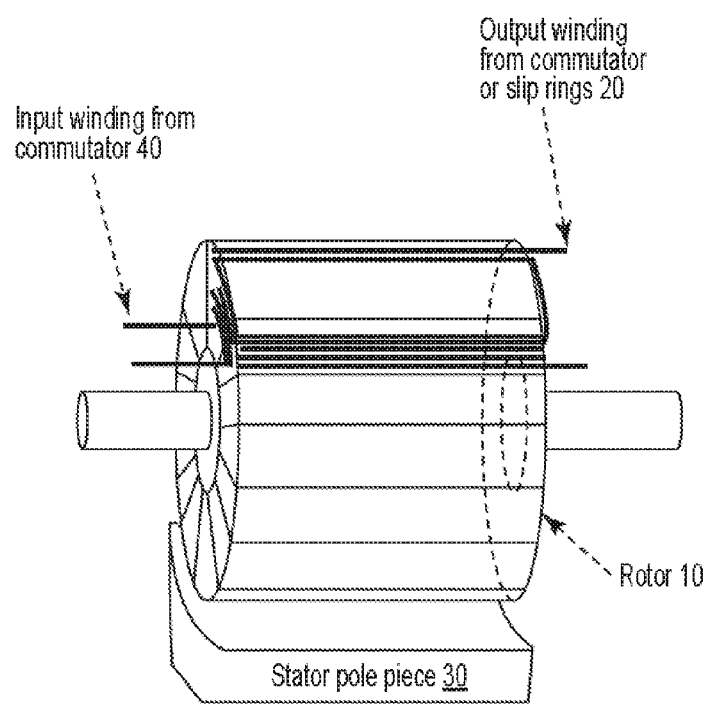
FIGURE 1: A prior art motor generator having common rotor and stator

Stator excited by 3-phase source L1(a), L2(a), L3(a)

Stator excited by 3-phase source L1(a), L2(a), L3(a)

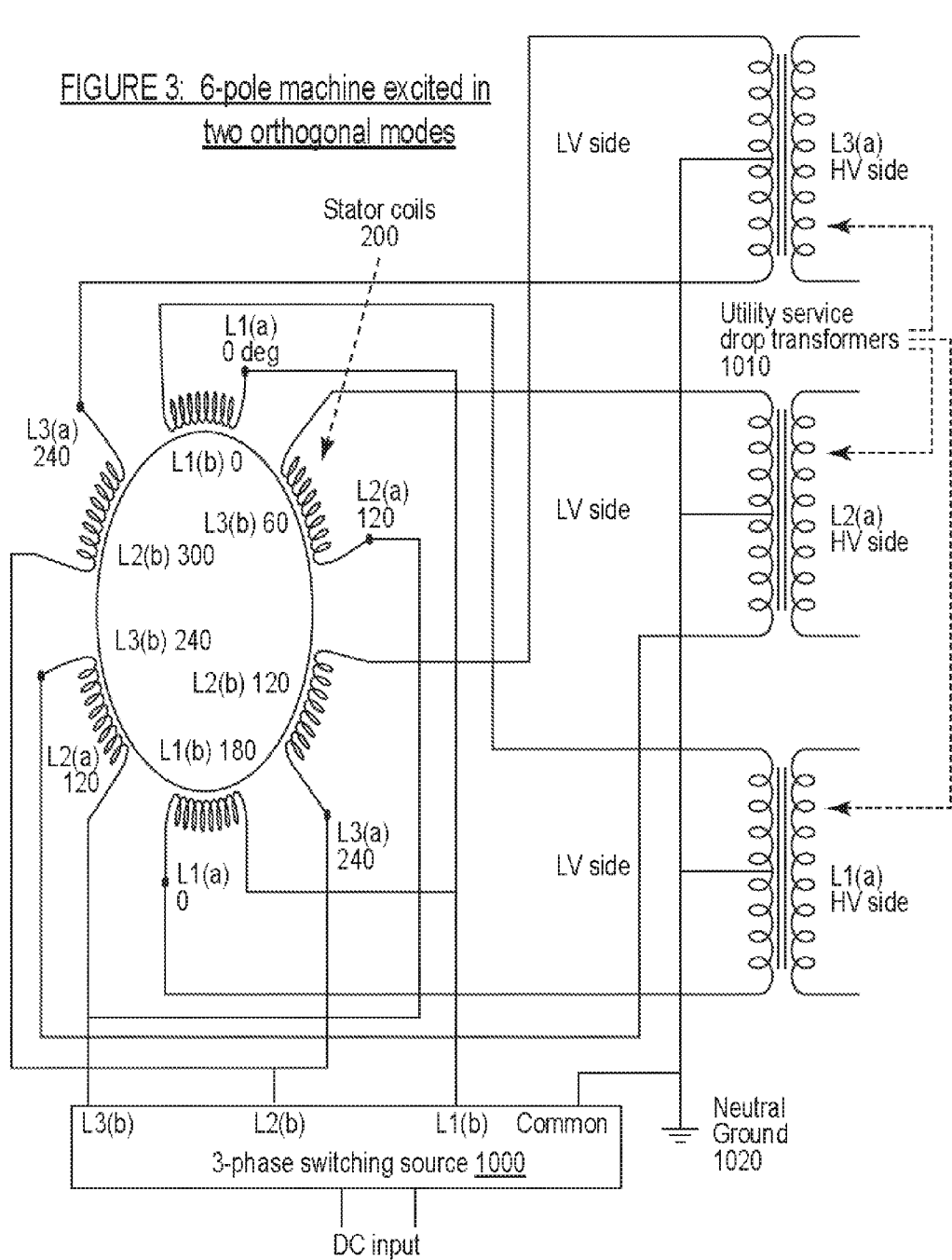

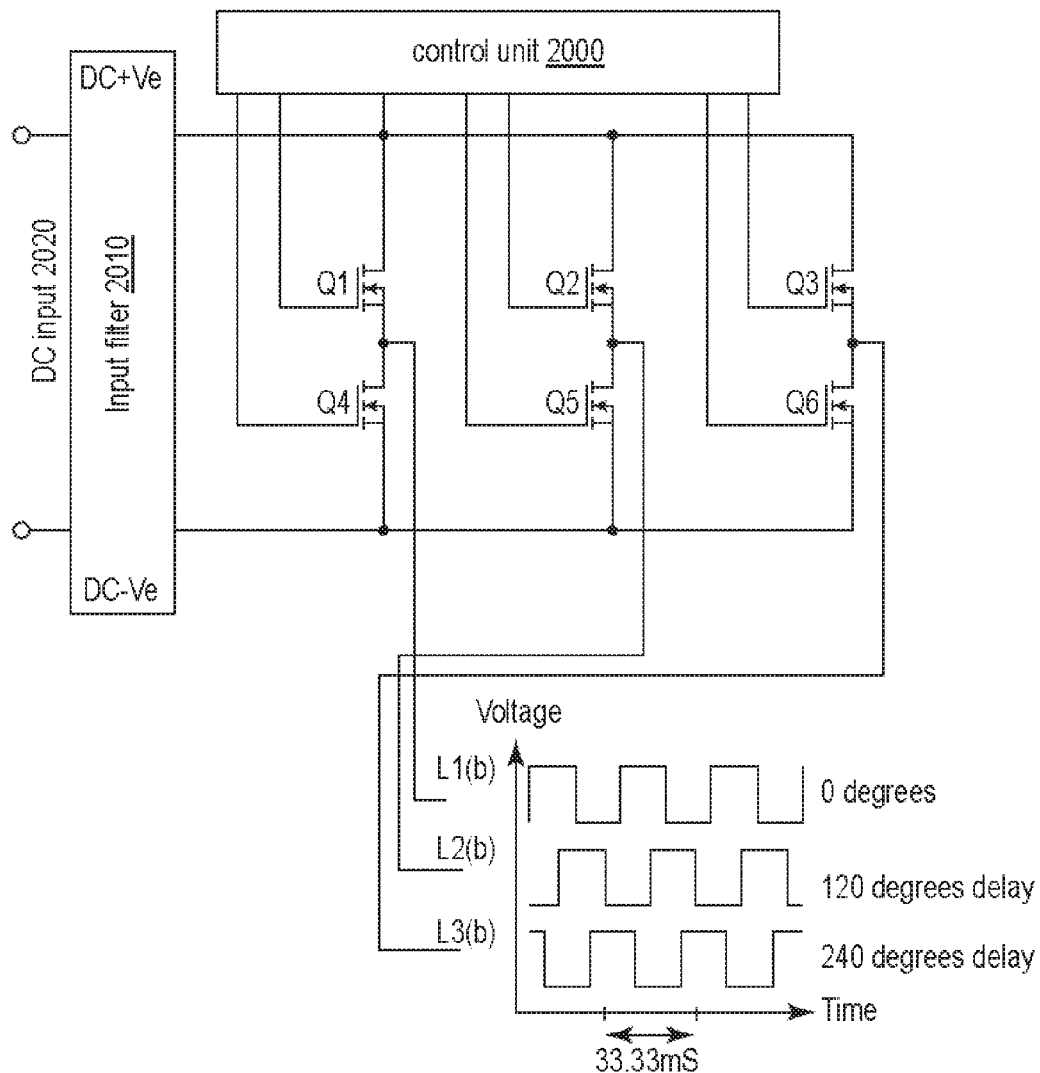
FIGURE 4: Switching transistor arrangement for producing 30Hz, 3-phase, squarewave excitation

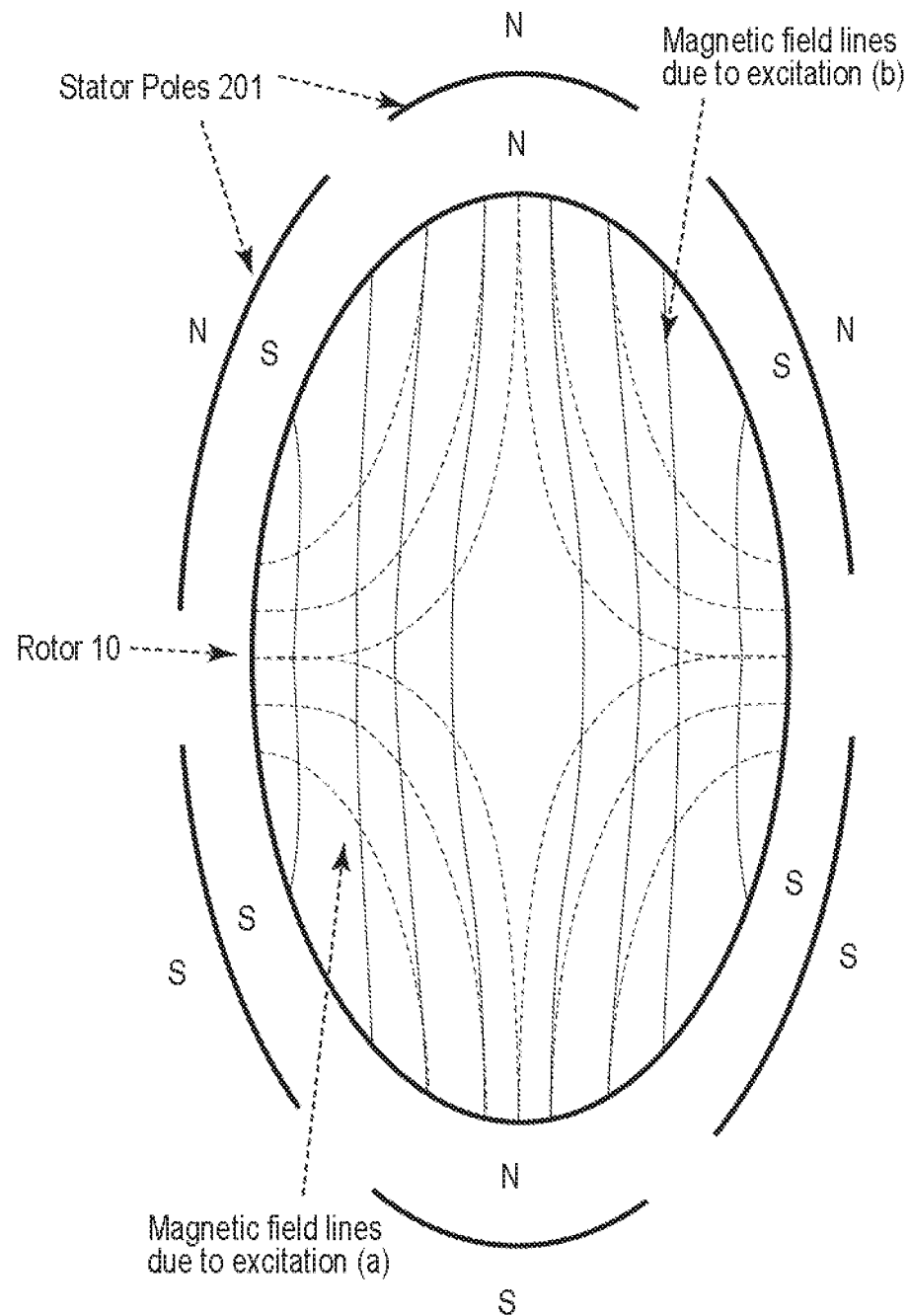
FIGURE 5: Magnetic field lines in the rotor

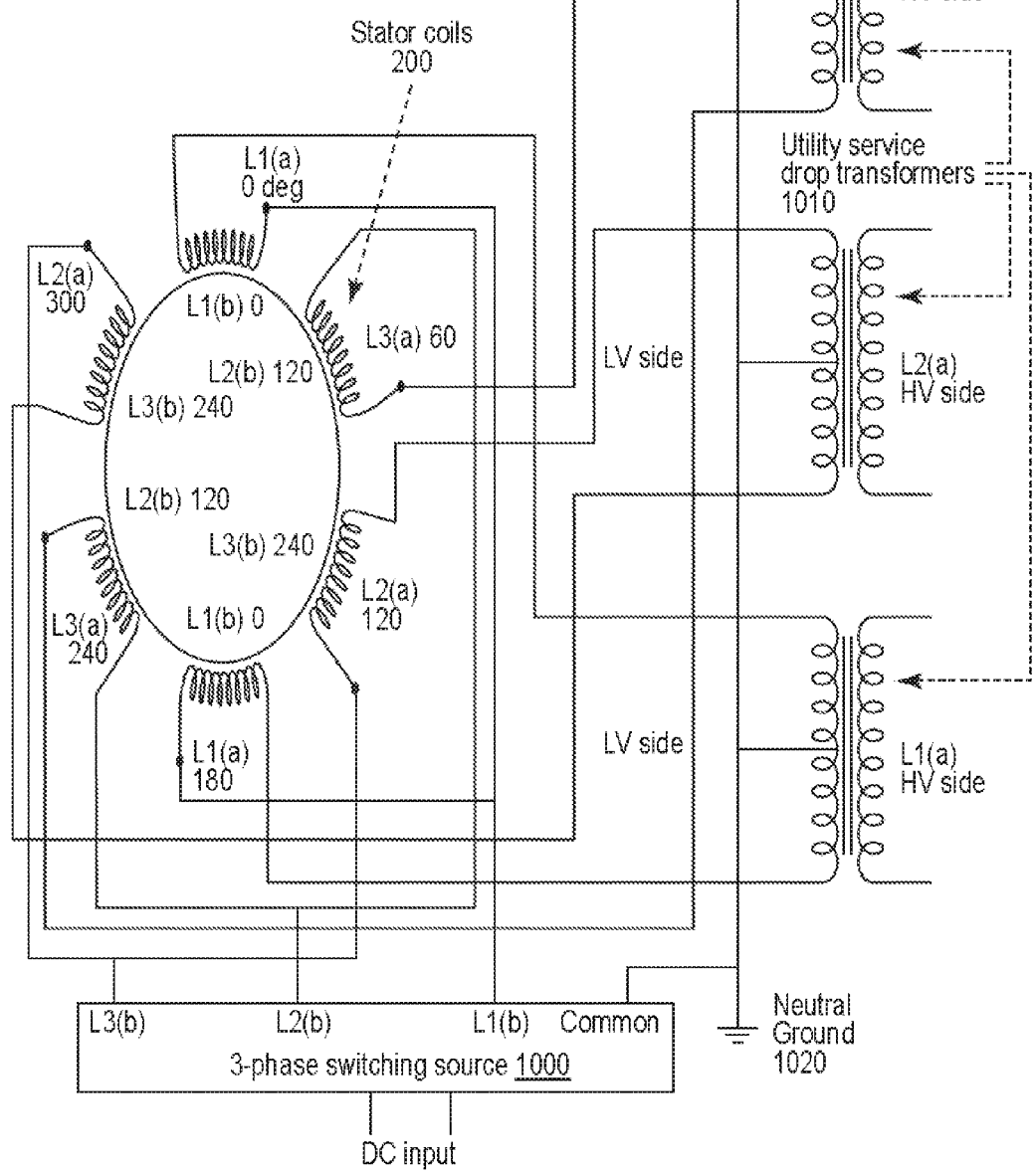

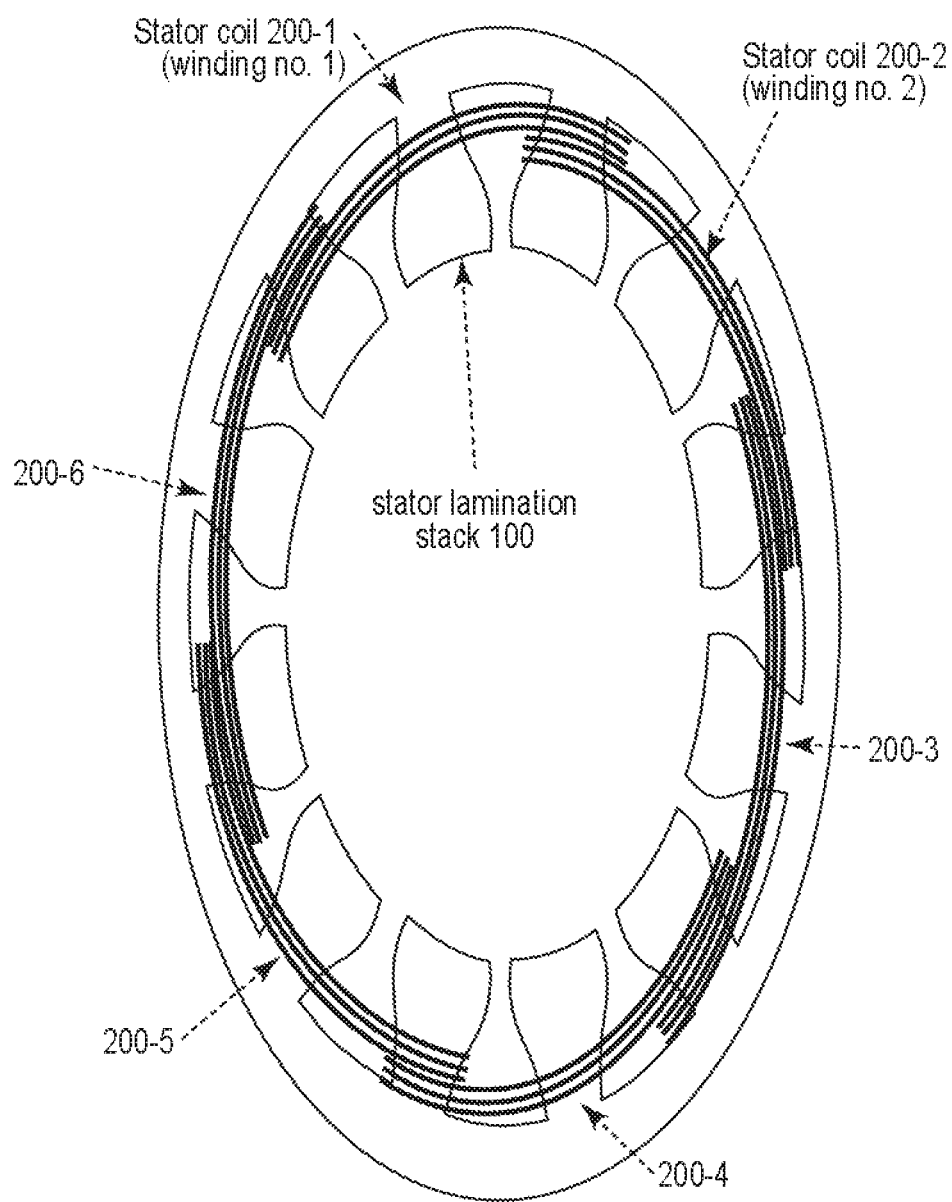
FIGURE 7: 6-pole winding using a 12-slot stator

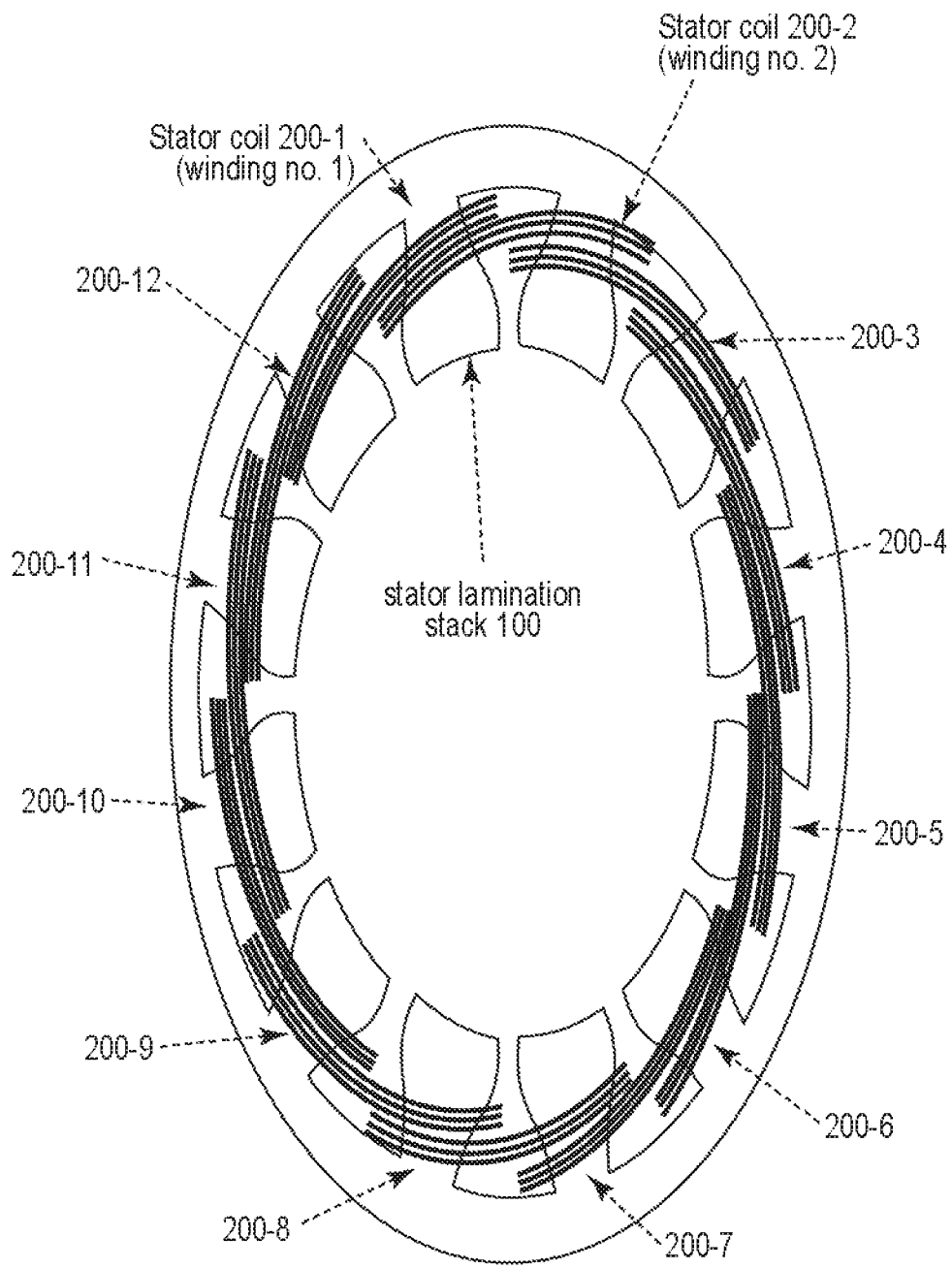
FIGURE 8: 12-pole winding using a 12-slot stator

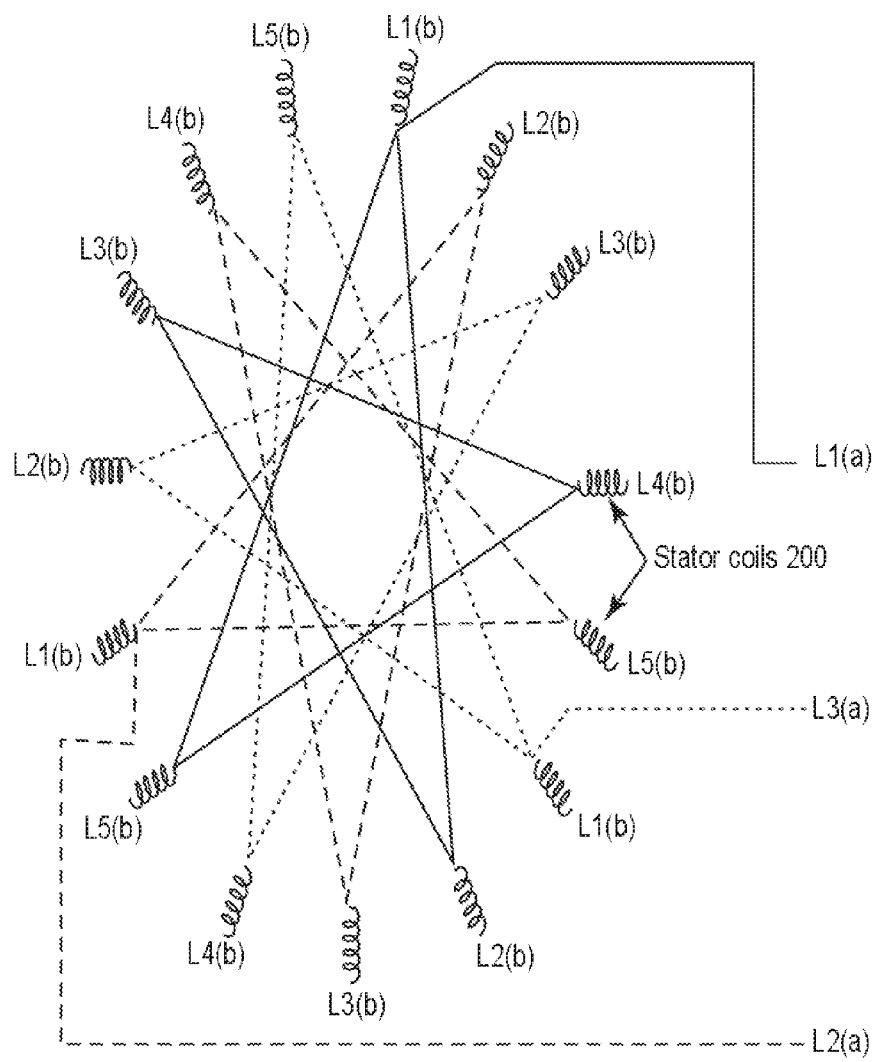
FIGURE 9: Simultaneous excitation with M(=5) phase and N(=3) phase voltages

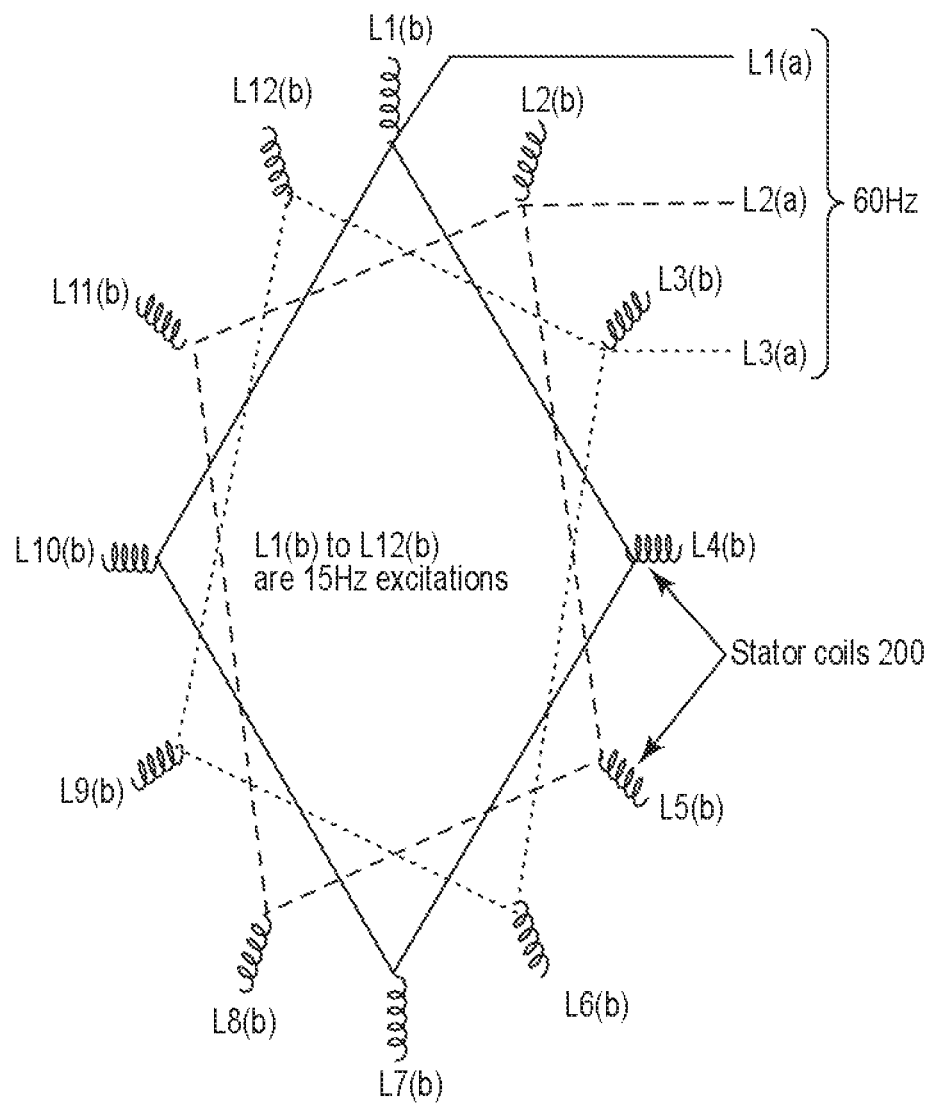
FIGURE 10: Simultaneous excitation with M(=12) phase and N(=3) phase voltages

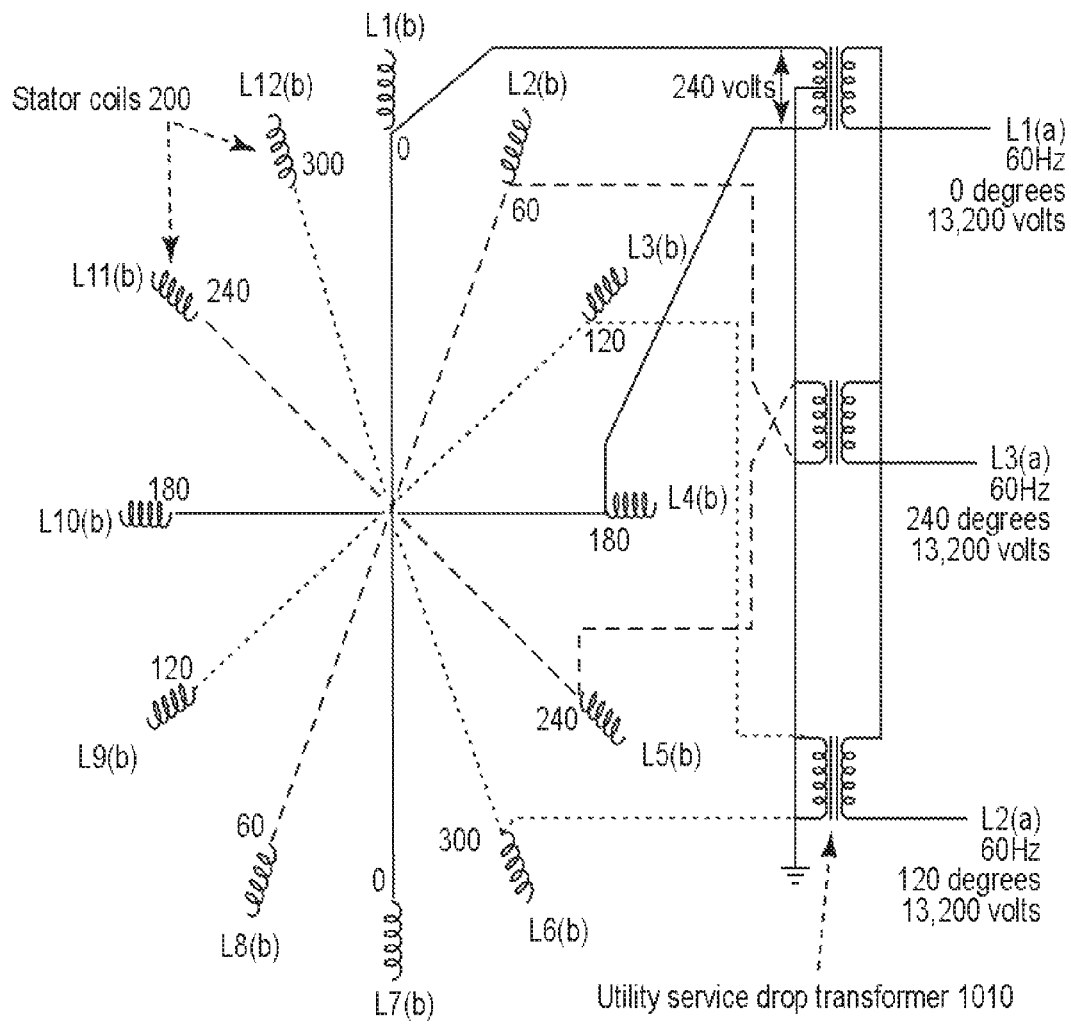
FIGURE 11: Alternative excitation with M(=12) phase and N(=3) phase voltages

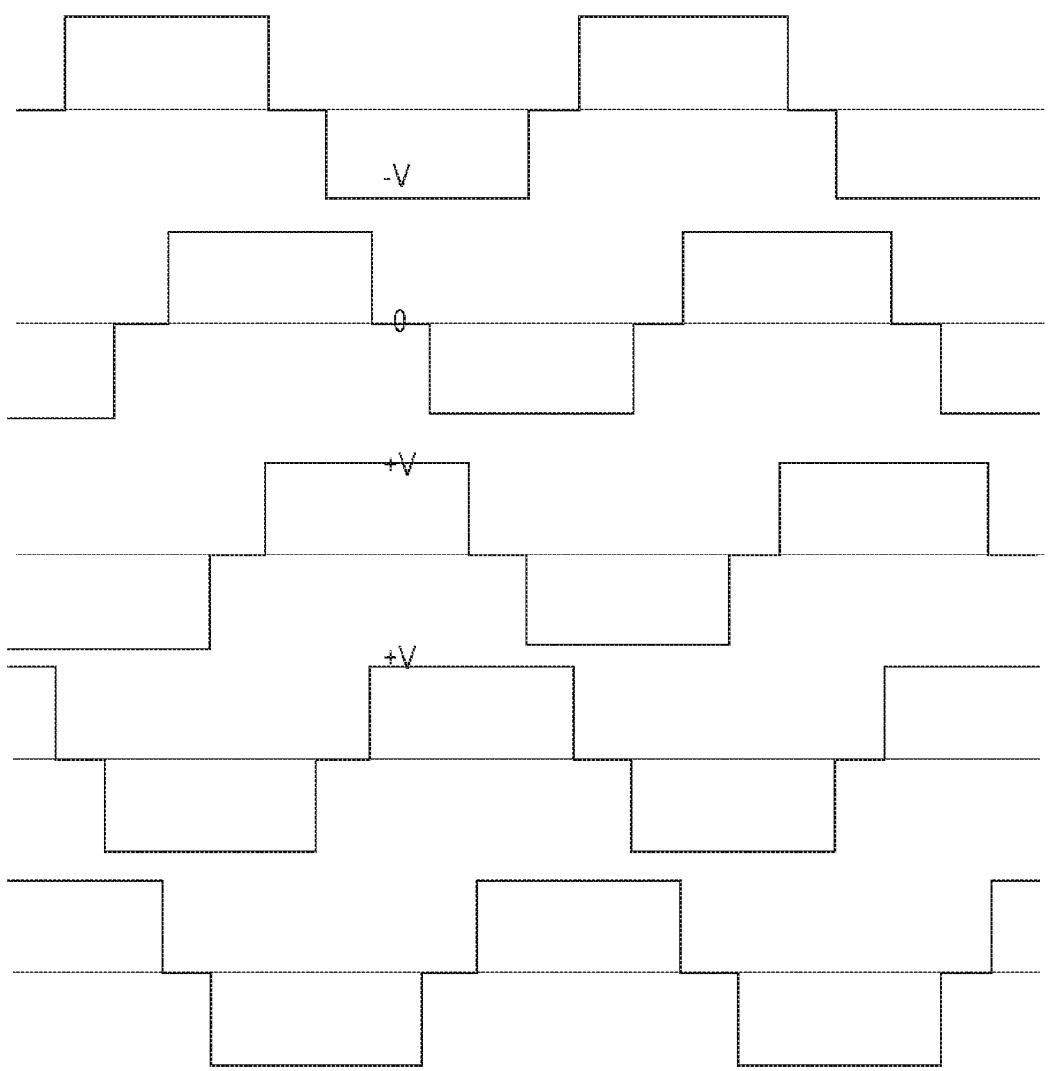

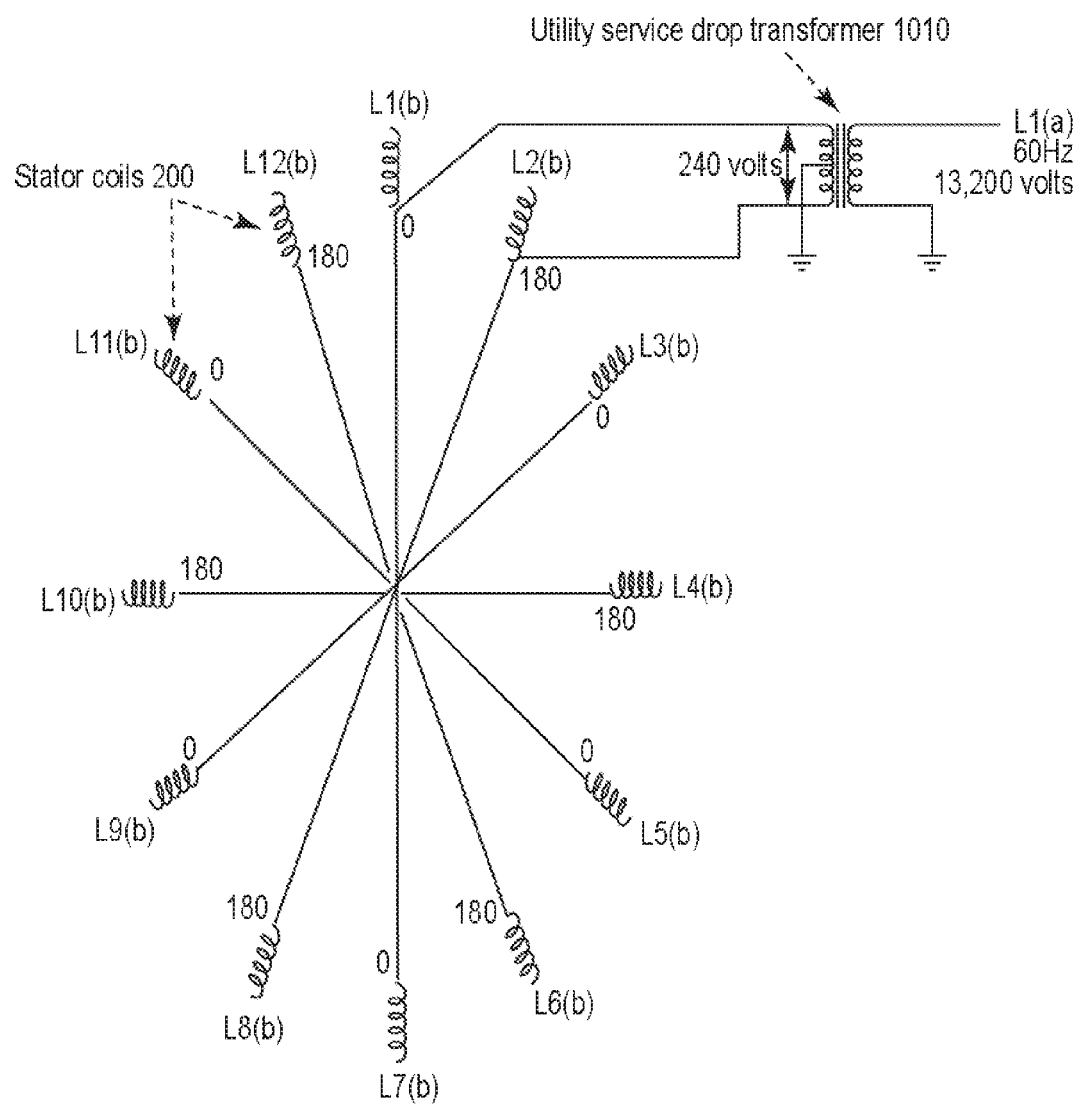
FIGURE 13: A single phase grid connection

ROTARY SOLAR CONVERTER

BACKGROUND

The invention relates to DC to AC conversion methods, and in particular to methods to convert DC power from a solar array into AC power for feeding directly into the electricity grid.

Various methods for DC to AC conversion are known in the art and new methods continue to be invented, as described in U.S. Pat. No. 8,937,822 to current inventor. In the art prior to solid state switching converters, it was known to use rotary converters to convert electrical power of one type into electrical power of another type. A rotary converter of the prior art comprised a motor driven by electrical power of one type at its input, the motor being mechanically connected to drive a generator to produce electrical power of another type at its output. Prior art rotary converters were known in which the motor and generator used separate rotors and field coils, and types were also known in which the motor and generator used the same stator coils and the same rotor, the rotor being wound with a motor winding connected by brushes to a DC input source and a generator winding connected through brushes and a commutator (for DC output) or slip rings (for AC output) to a load. When the input power was at one DC voltage and the output power was at another DC voltage, the rotary converter was also known as a dynamotor. When the input power type was DC and the output power type was AC, the rotary converter was also known as an Inverter. Rotary Inverters were commonly used in aircraft to convert 28 volts DC to 115 volts AC at 400 Hz, but have largely been replaced by solid state inverters in modern aircraft.

The prior art also includes a type of rotary converter for producing 3-phase power from single-phase power: A single-phase induction motor has additional windings from which a second and third phase can be derived. This type of converter is characterized by AC in and AC out that both comprise sinusoidal waveforms at the same frequency.

Neither a motor nor a generator is 100% efficient, therefore the efficiency of a motor-generator combination is the product of the efficiencies of the motor and the generator respectively. For example, if the motor converts DC power to mechanical rotational energy with an efficiency of 75%, and the generator converts rotational energy to AC electrical output power with an efficiency of 80%, then the combined efficiency of DC to AC conversion is 80×75=60%. Low conversion efficiency was thus a characteristic of prior art rotary converters having separate motor and generator sections. Dynamotors and rotary inverters with a common rotor and stator also tended to have low efficiency due to brush friction, brush voltage drop and field power requirements, as well as the fact that having input and output windings on the same rotor limits the gauge of wire that can be used for each.

Rotary inverters have several advantages however; rotary inverters can produce clean, pure sinewave output voltage waveforms; rotary inverters can handle and withstand short periods of high overload due to the inertia of the rotor; rotary inverters can easily produce one, two, three or more output phases and rotary inverters have the potential to be of lower cost than solid state inverters in certain higher power ranges. Other advantages of a rotary inverter in solar energy applications will become apparent upon reading the description herein of the invention. A rotary inverter with improved efficiency, comparable to a solid state DC to AC inverter, can therefore provide an advantageous alternative to purely solid state inverters.

SUMMARY

A mechanical, rotary DC to AC inverter is described in which the motor and generator sections are merged into a single induction-type rotor and single set of stator coils, there being thereby no mechanical energy output required from a motor shaft and no mechanical energy input required to a generator shaft.

The number of stator poles or coils N is not prime and can be connected to a polyphase AC source in as many different orthogonal modes as there are factors of N.

In an exemplary implementation, N=6, and the six stator coils are connected to a 3-phase electric utility grid of frequency F in the phase progression 0, 120, 240, 0, 120, 240 degrees while simultaneously being connected to a source of power at frequency F/2+dF in the phase progression 0, 60, 120, 180, 240, 300 degrees, the rotor turning at a frequency of approximately (F+dF)/2 revs/sec.

When the slip frequency dF is positive, this results in power being transferred from the source of frequency F/2+dF to the utility grid at a frequency F and with a pure sine waveform substantially irrespective of the waveform of the source of frequency F/2+dF, which may therefore be a two-level switching waveform. Other values of N and other orthogonal modes are also described.

In an inventive solar farm application, the source of frequency F/2+dF is derived from a solar array by on/off switching transistors which do not produce a pure sinewave, and a control circuit adjusts dF such that the maximum amount of power is transferred from the solar array into the utility grid with a pure sine waveform.

In a preferred implementation, N=12, and the machine is excited by a 12-phase square-wave source with power derived from a solar array and is excited by 6-phases (3-phases and their inverses) from the electricity grid, the 12-phase solar-derived source operating at half the grid frequency plus a slip frequency which is controlled to deliver the maximum power from the solar array to the electricity grid.

Due to the generator operation of the invention being of the synchronous, induction type, the invention automatically fulfills the requirement to stop feeding power to the grid should the grid fail.

BRIEF DESCRIPTION OF THE DRAWINGS

FIG. 1 shows a prior art motor-generator combination

FIG. 3 shows a 6-pole rotary machine stator excited simultaneously in two orthogonal modes FIG. 4 shows a transistor switching arrangement for generating 3-phase, non-sinusoidal power waveforms.

FIG. 5 shows magnetic field lines in a rotor when excited with two orthogonal excitations.

FIG. 6 shows an exemplary circuit for exciting a rotary machine in two orthogonal modes simultaneously.

FIG. 7 shows one way of winding the stator coils in the stator lamination slots for a 6-pole machine.

FIG. 8 shows one way of winding the stator coils in the stator lamination slots for a 12-pole machine.

FIG. 9 shows a general method of exciting an N×M pole machine in an N-phase mode and an orthogonal M-phase mode.

FIG. 10 shows another general method of exciting an N×M pole machine in an N-phase mode and an orthogonal M-phase mode when M is even.

FIG. 11 shows the preferred stator coil connections for a 12-pole machine.

FIG. 12 shows the waveforms of a 3-level, 5-phase excitation wherein the five phase waveforms sum to zero at every time instant.

FIG. 13 shows the connections of a 12-pole machine to a single-phase electricity grid.

DETAILED DESCRIPTION

Figures 2A, 2B:
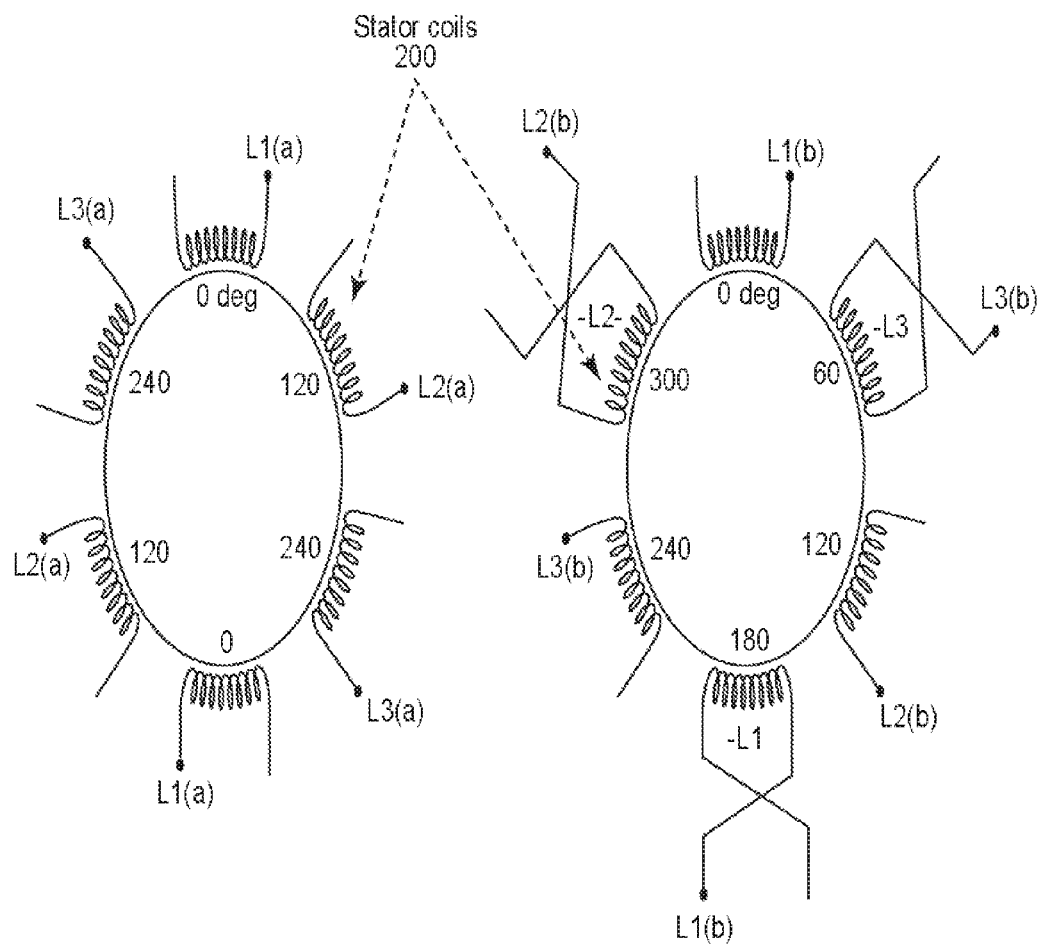
FIG. 2A shows a 6-pole rotary machine stator excited in a first mode
FIG. 2B shows a 6-pole rotary machine stator excited in a second mode

FIG. 1 illustrates a prior art motor-generator combination in which the motor and generator share the same rotor and stator. The stator comprises magnetic pole pieces 30 disposed in opposite pairs around rotor 10. In the prior art, the stator field was produced by an electromagnet using stator coils (not shown), the field coil power being a first factor contributing to loss of efficiency. If such a device were to be manufactured using modern technology, neodymium permanent magnets would preferably be used to produce the field.

Rotor (1) is formed by stacking star-shaped, iron laminations on a shaft. The stack of rotor laminations forms slots to hold the input rotor windings (40) and the output rotor windings (20). Because the rotor slot volume has to accommodate both input and output windings, the wire cross sectional area available for each winding is only half of that which otherwise could have been used for a single winding. The resistance of each of the input and output windings is thus around double (or more due to the need for insulation) that of a single winding occupying the same slots, which is a second factor contributing to loss of efficiency When the input is DC, the prior art supplied the DC to the input windings through a commutator and carbon brush arrangement. When the required output was also DC, the output windings supplied the load through a commutator and brush arrangement, else for an AC output, through slip-rings and brushes. The frictional and electrical losses of the brushes and commutators or slip rings is a third factor contributing to loss of efficiency.

FIGS. 2A and 2B illustrate an arrangement of six stator coils for a 6-pole induction machine. In an induction machine, (motor or generator) power input goes to or power output comes from the stator coils. The rotor comprises a revolving magnetic core as in FIG. 1, except that the rotor winding is simply a short circuit formed by one or more closed loops of copper bar, and no connection to the rotor is needed by means of brushes and commutators or slip rings. Some of the aforementioned sources of efficiency loss in the machine of FIG. 1 are thus avoided.

The six stator coils (200) of FIG. 2A may be excited by alternating current in the phase progression 0, 120, 240, 0, 120, 240 degrees. Because the phase goes through two cycles around 360 degrees of mechanical rotation, a rotating magnetic field is produced at half the AC frequency. For example, if the AC frequency is 60 Hz, the magnetic field rotates at 30 revolutions per second and drags the rotor around at that speed, that is 1800 RPM. If the rotor revolves at exactly that speed, moving around with the magnetic field, it experiences a static magnetic field in its rotating frame of reference and thus does not experience a torque force. A torque is required if the shaft is to drive a load, and in that case, the rotor revolves at slightly less than 1800 RPM, the difference being called the slip rate. This results in the rotor containing a static magnetic field in the 1800 RPM-rotating frame of reference, misaligned by 90 degrees to the stator field in the same frame of reference. The attempt by these misaligned magnetic fields to align themselves produces the torque to turn the rotor against the load.

If on the other hand a torque is supplied to the shaft that attempts to turn the rotor at a greater rate than 1800 RPM, the rotor will experience a magnetic field rotating in the opposite direction in its rotating reference frame, thus causing drag opposing the torque. The energy supplied to turn the shaft against this drag appears as power flowing back to the exciting source, and this is the principle of the synchronous induction generator. An induction generator only generates power in this way when connected to a pre-existing source of excitation, such as the electricity grid. If the source of excitation vanishes, the generator stops generating power as there is no longer any magnetic field created by the stator coils. This renders the induction generator a favorite for wind turbines that feed power to the grid, as they will stop feeding power to the grid if the grid fails, as required by regulations. Somewhere in the grid system, there must be a source that is not an induction generator, such as a generator with an independent field excitation, as used in electric utility power stations.

FIG. 2B shows that the same six stator coils can be excited in the phase progression 0, 60, 120, 180, 240, 200 degrees, which goes through only one cycle in one mechanical revolution. This produces a magnetic field that rotates at the same frequency as the excitation source, namely 60 revolutions per second for 60 Hz or 3600 RPM. On the other hand, using 30 Hz excitation in this mode would produce 1800 RPM, as when using 60 Hz in the mode of FIG. 2A.

FIGS. 2A and 2B are merely illustrative of 6 stator coils, and are not intended to imply that a coil spans only two poles. FIGS. 7 and 8 illustrate winding configurations in which each stator coil spans more than one pole, and in which adjacent coils have some overlap. All of the known art of efficient polyphase motor or generator design may be applied in choosing a most appropriate winding configuration for the invention, and many text books and academic papers on the subject have been written and are readily available. The modern method of finite element analysis may also be applied to optimize the design of such rotating electrical machines when configured according to the invention.

It will be appreciated that a phase of 60 degrees is 180 degrees removed from a phase of 240 degrees, such as shown as phase L3($a$) in FIG. 2A. Therefore the current for the 60-degree coil of FIG. 2B is produced by reversing the coil connections to a phase of 240 degrees. Likewise, a phase of 300 degrees is simply a phase of 120 degrees with the coil connections reversed.

FIG. 3 illustrates how the six stator coils can be excited in both modes simultaneously, using 60 Hz for the mode of FIG. 2A and 30 Hz for the mode of FIG. 2B to produce the same 1800 RPM for each. The two 0 degree stator coils excited with L1($a$) are joined in series so that the same current flows through both from the L1-phase utility transformer 1010. There is a utility transformer for each of phases L1, L2 and L3 which drop the high voltage used for electricity distribution, typically 13200 volts, to, for example, a split-phase 120-0-120 supply on the low voltage side, having 240 volts between the ends and a grounded neutral in the middle. The L2 and L3 utility transformers feed the L2($a$) 120 degree phase coils and the L3($a$) 240 degree phase coils likewise. The terminals on either side of the neutral on the secondary (LV) side of the utility transformers are generally called "hot legs". The two hot legs of a single, split-phase service, as is normally supplied to residential customers, are normally denoted by L1, L2 while a 3-phase 120/208 volt service has three hot legs denoted L1, L2, L3. In FIG. 3, three split-phase drops are used, each coming from a separate one of the three grid phases, so that six hot legs and six phases are available.

The junction where the two L1(a) 0-degree coils are series connected and the center tap of the L1 utility transformer, which is also neutral or ground, provide a pair of terminals into which the 30 Hz L1(b) excitation may be fed. The current in the two L1(a) 0 degree coils will now be flowing in the opposite direction in one coil compared to the other for the L1(b) excitation. Likewise the L2(b) excitation is applied to the junction of the two L3(a) coils and the L3(b) excitation is applied to the junction of the two L2(a) 120 degree coils, these connections as shown in FIG. 3 ensuring that the directions of rotation corresponding to the 30 Hz (b) excitation and the 60 Hz (a) excitation are the same.

The L1(b), L2(b) and L3(b) excitation phases are derived by switching transistors commutating a floating DC input source. The switching transistors do not need to produce a sine wave, and may produce a square wave with three phases. When either the DC source is floating or the neutral of the utility transformers is not grounded, or both, the (b) excitation may be regarded as a 3-wire "open WYE" connection. If on the other hand the DC source is balanced about ground and the neutral of the utility transformers is grounded, then the (b) excitation is a 4-wire, 3-phase WYE connection having a neutral and three hot legs.

With the 30 Hz excitation exactly half the frequency of the 60 Hz excitation, and there being no mechanical load on the rotor shaft, the slip rate would be negligible and the rotor would rotate at substantially exactly 1800 RPM. In principle, no current or power would flow to or from either excitation source, except for reactive current and power required to fund iron losses.

If now the 30 Hz source is increased in frequency by dF, a rotor moving at 1800 RPM would now experience a magnetic field rotating at frequency dF in the rotor's rotating frame of reference, which thereby attempts to drag the rotor around at the higher speed of 1800+60 dF RPM. If the rotor were to turn at that rate however, it would now experience a magnetic field due to the 60 Hz excitation rotating at 60 dF RPM in the opposite direction, causing drag, and with power flowing to the utility grid instead of from the grid. A balance between torque due to the 30 Hz+dF excitation and the drag caused by the slower speed 60 Hz excitation is reached when the rotor turns at somewhere in the region of 1800+60 dF/2, having thus a negative slip rate around −dF/2 relative to the 30+dF Hz excitation and drawing power therefrom, while having a positive slip rate around +dF/2 relative to the 60 Hz grid excitation, and delivering power thereto.

The two modes of FIGS. 2A and 2B are orthogonal, due to diametrically opposite stator coils being fed in phase in one mode and 180 degrees out of phase in the second mode. Thus when feeding the machine with both modes simultaneously, none of the L1(b), L2(b), L3(b) excitation is fed into the utility grid; in effect, each diametrically opposite pair of stator coils forms a balanced bridge with the center-tapped utility transformer. The L1(b), L2(b), L3(b) excitation may therefore depart from a sinewave without causing the current fed to the utility to depart from a sinewave. For example, the L1(b), L2(b), L3(b) excitation may be a squarewave produced by a simple arrangement of switching transistors FIG. 4 shows more internal detail of unit (1000) of FIG. 3, and the switching transistor arrangement for producing a 3-phase squarewave excitation. Since the switching frequency is very low, for example the above-mentioned 30 Hz, the transistors can be very large area MOSFETs giving negligible voltage drop and negligible switching losses. Mechanical switches could even be used at such a low switching frequency.

Control unit (2000) produces drive signals for the six MOSFETs Q1 to Q6. At the start of a cycle, Q1 is controlled to conduct while Q4 is off, making signal L1(b) positive and equal to the positive DC supply voltage. Likewise Q2 is off and Q5 is on, making signal L2(b) equal to the negative DC supply voltage. Q3 is on and Q6 is off so that L3(b) is also positive. After ⅙th of a cycle, Q3 is turned off and Q6 turned on sending L3(b) negative. After another ⅙th of a cycle, Q2 turns on with Q5 off, sending L2(b) positive. Control unit (2000) continues to switch the transistors on and off in a sequence to produce the three indicated squarewaves, which are $\frac{1}{3}^{rd}$ of a cycle or 120 degrees of phase apart.

Input filter (2010) is a low pass filter to prevent at least high frequency switching transients being exported to the DC input (2020). Filter (2010) may comprise capacitors connected between the DC+ve and the DC−ve as well as capacitors connected to the neutral/ground (1020) of FIG. 3. If the latter capacitors are large such that the DC+ve and DC−ve voltages are prevented from changing at the low switching frequency, then each of the L1(b), L2(b), L3(b) waveforms is effectively referenced to a mean voltage around zero and thus constitutes a 4-wire, 3-phase WYE connection to the rotary machine stator coils. On the other hand, if the capacitors to neutral/ground are small, allowing the DC−ve and DC+ve voltages to change during each cycle according to a common-mode ripple waveform, then the 3-phase output is effectively a 3-wire open-WYE connection. The choice of one or the other is not critical and may be determined empirically with an actual machine for best performance. In the case of the open WYE mode, a common mode signal on the DC input can be useful in detecting ground faults, as described in allowed U.S. patent application Ser. No. 13/103,070 to current Applicant, which is hereby 280 incorporated by reference herein in its entirety.

If the DC source is strictly balanced relative to ground, rather than floating as assumed in the preceding paragraph, then the machine is also being fed with a 4-wire, 3-phase WYE source. Since it is more difficult to produce a strictly balanced, bipolar DC source from solar arrays, allowing the DC source to float is appropriate when the source is a solar array, and thus the open WYE mode is preferred.

A brief outline of the theory of operation of the inventive rotary machine will now be given.

When the magnetic circuits are operated in the linear region of the magnetic core material's B-H curve, that is below saturation, the principle of superposition applies; that is, the magnetic flux density vector field B due to applying two magnetizing force excitation vector fields H simultaneously is equal to the vector sum of the B-fields that would have been obtained by applying each of the H fields alone, one at a time.

FIG. 5 illustrates the two sets of field lines that would be created by applying each of the excitations of FIG. 2 one at a time. The shapes of the field lines in FIG. 5 are purely illustrative as in reality they depend on the number, size and shape of the rotor winding slots.

The six stator poles (201), when excited by excitation (a) of FIG. 2, take on magnetic polarities NSSNSS respectively around 360 degrees and at a particular time in the AC cycle of excitation (a), where the bold letter N indicates a magnetic strength that is double that of the S poles. The magnetic field lines produced by this excitation in rotor (10) are indicated by dashed lines.

When the stator poles are excited by excitation (b) of FIG. 2, the pole polarities are NNSSSN at a particular time of the AC cycle of excitation (b), and the field lines are shown solid.

The magnitude of a field indicated by the field lines of FIG. 5 remains very nearly constant while rotating if the associated 3-phase excitation is sinusoidal, which fact derives from the trigonometric identity $COS^2+SIN^2=1$. On the other hand, the magnitude of the field lines does not remain constant under rotation when the excitation is not sinusoidal, such as a square wave.

The total field when both excitations are applied simultaneously is the vector sum of the solid and the dashed fields, at least in the linear domain of the magnetic material's B-H loop. In fact, if the excitations are voltage sources, the flux density produced by each is proportional to the time integral of the coil voltages, irrespective of non-linearity of the B-H loop. Notwithstanding this fact however, it is undesirable to drive the magnetic material into the saturation region of the B-H loop as this causes excessive current peaks as well as hysteresis loss.

If excitation (b) was at exactly half the frequency of excitation (a), the two fields would rotate at the same rate and the sum field would be of constant shape. Due to the need for a slip rate to achieve power transfer however, the frequency of excitation (b) is slightly higher than half that of excitation (a), so the solid field lines rotate relative to the dashed field lines producing a sum field that is of a shape that varies cyclically at the difference frequency $F(b)-F(a)/2$.

A voltage is induced in a stator coil by a time-changing magnetic field. The magnetic field can change either due to the magnitude of the rotor field changing or due to its direction changing by virtue of its rotation. The total voltage induced is due to the sum of the changes in amplitude and/or direction of both the solid and dashed magnetic field lines. However, whether by amplitude change or direction change, the voltage induced by changes in the magnetic field due to excitation (b) are equal and opposite in diametrically opposite stator coils. Since diametrically opposite stator coils are connected in series to an associated utility transformer (see FIG. (3)), the voltages fed back to the utility due to changes in amplitude or direction of the magnetic field due to excitation (b) cancel. Thus it is immaterial if the amplitude of the solid field varies, and thus the associated excitation (b) need not be sinusoidal. The voltages and currents fed back to the utility transformers thus remain sinusoidal (at e.g. 60 Hz) despite the driving voltages from the switching transistor arrangement of FIG. 4 being square waves (at e.g. 30+dF Hz).

If, in FIG. 3, the connections to one of each pair of diametrically opposite coils is reversed, then the utility transformers excite the stator coils in the phase progression 0, 60, 120, 180, 240, 300 while the second excitation excites the stator coils in the phase progression 0, 120, 240, 0, 120, 240, as shown in FIG. 6. To achieve this while maintaining the same direction of rotation, L2(*a*) and L3(*a*) have to be interchanged as well as L2(*b*) and L3(*b*).

There are also other ways to connect the stator coils to swap the phase progressions of the (a) and (b) excitation. For example, if the connections to both L3(*a*) coils are reversed, then it is simply necessary to reverse the connections to the L3 utility transformer to maintain the same phase progression. Of course it is not necessarily important to maintain a particular direction of rotation, so there are other ways to connect the stator coils together and to the utility transformers which will give the desired phase progressions or the reverse progressions.

When the (a) and (b) phase progressions are swapped, the 60 Hz utility current now excites a mode which undergoes a single cycle of phase progression around 360 degrees, so the machine of FIG. 6 will rotate at 60 revolutions per second or 3600 RPM. Now the L1(*b*), L2(*b*), L3(*b*) excitation must be at at frequency of twice the utility or 120 Hz to correspond to the same speed of rotation, and the control unit of FIG. 4 must be sped up to four times the switching frequency of FIG. 4 to generate a 3-phase square wave excitation at 120 Hz.

Whether the connections of FIG. 3 or FIG. 6 are used depends on whether a particular machine design works best with the L1(*b*), L2(*b*), L3(*b*) excitation at 30 Hz or 120 Hz. Factors which can influence the choice are an increased reactive current to be supplied by the switching transistors when 30 Hz is used versus the increased magnetic losses if the higher frequency of 120 Hz is used. For the same number of turns on the stator coils, the voltage required for the 120 Hz excitation mode of FIG. 6 will also be higher than for the 30 Hz excitation mode of FIG. 3.

When the arrangement of FIG. 6 is used, current due to excitation (b) flows in the low voltage side of the utility transformers. Even though it is flowing in opposite directions in the two halves of each transformer and thus cancels, it nevertheless causes additional heating in the windings, which must therefore be over-dimensioned. To avoid this, an alternative circuit is shown in FIG. 11. Before discussing FIG. 11 however, two general arrangements will be described for exciting the stator coils of a N×M pole rotary machine simultaneously with an N-phase and an orthogonal M-phase excitation.

FIG. 9 show 15 stator coils 200 fed at one end with 3 repetitions of a 5-phase excitation denoted by L1(*b*), L2(*b*), L3(*b*), L4(*b*), L5(*b*). As is evident from FIGS. 7 and 8, the number of stator coils and independent magnetic poles does not necessarily correspond to the number of winding slots in the laminations. As is known in the art, a single winding may be distributed between multiple slots in the stator laminations in order to shape the angular distribution of magnetic field and thus produce fewer harmonics in the case of a generator.

The ends of the coils to which the 5-phase excitation is applied are called the outer ends to distinguish them from the other ends, which are called. the inner ends. The inner ends of one each of an L1(*b*), L2(*b*), L3(*b*), L4(*b*), L5(*b*) coil are then connected to one phase of a 3-phase excitation L1(*a*), L2(*a*), L3(*a*). Because there are three groups of coils each having an L1(*b*), L2(*b*), L3(*b*), L4(*b*), L5(*b*) excitation, the other ends of each group can be connected to a different one of the 3-phase excitations L1(*a*), L2(*a*), L3(*a*).

There are essentially two ways in which one each of an L1(*b*), L2(*b*), L3(*b*), L4(*b*), L5(*b*) coil can be selected to form three groups. In one arrangement, the inner ends of each group of five adjacent coils are connected to form the three groups. These groups would be fed at their inner ends with L1(*a*), L2(*a*) and L3(*a*) respectively going clockwise. This produces a machine which would rotate once for every cycle of the (a) excitation, i.e. 3600 RPM for a 3-phase (a) excitation of 60-Hz. The alternative is shown in FIG. 9, wherein the inner end of an L1(*b*) coil is connected to the inner end of an L2(*b*) coil spaced 6 away clockwise and then successively to an L3(*b*), L4(*b*) and L5(*b*) coil spaced likewise, thereby forming the solid 5-pointed star connection pattern. This connection receives the L1(*a*) excitation.

The dotted and the dashed 5-pointed star connection patterns connect the inner ends of the remaining coils to the L2(a) and L3(a) excitations respectively. Now it may be seen that the 3-phase excitation of the 15 coils is L1(a), L2(a), L3(a) . . . repeated 5 times around the circle. With this connection, the machine rotates at $\frac{1}{5}^{th}$ the frequency of the (a) excitation, that is at 720 RPM for 60 Hz. The (b) excitation repeats three times around the stator, so must be at a frequency of 36 Hz to correspond to the same rotation speed of 720 RPM.

The (a) and the (b) excitations do not couple to each other as long as L1(b)+L2(b)+L3(b)+L4(b)+L5(b)=0. This is true if the (b) excitation is a 5-phase sinusoidal waveform but not if it is a 5-phase squarewave. However, a 5-phase modified square wave may be used if, at every point in time, two of the signals are +V volts, two of the signals are −V volts and a fifth is zero, as illustrated by the waveforms of FIG. 12. Such a waveform is known as a modified squarewave and is also known as a modified sinewave in the special case that it has the same peak and RMS values as a sinewave. For orthogonality, it is actually the L1(b) . . . L5(b) currents that should sum to zero, and this can be approximately arranged using a 5-phase version of the transistor switching circuit of FIG. 4 by having both transistors of a pair such as (Q1, Q4) turned off when that phase is desired to be zero rather than positive or negative. The MOSFET transistors have intrinsic drain-source diodes which will catch any back-EMF from opening a stator coil, thus preventing damage; however, this will also result in the sum of the 5-phase current not being perfectly zero at all times, but exhibiting glitches which will feed into the (a) excitation.

Even when it is not necessary to create such 3-level waveforms, it can be advantageous to have a short period when both transistors of a pair are off when switching polarity. This so called "notching" of the drive waveforms reduces current transients.

The condition for the (a) excitation phase currents to sum to zero can be more easily and accurately met when the number of (a) phases is even, allowing half of them to be positive, and the other half to be negative, eliminating the need for a zero current level.

FIG. 10 shows an arrangement of 12 stator coils fed with a 12-phase (b) excitation at their outer ends and connected to a 3-phase excitation at their inner ends. As previously discussed, the number of stator coils is preferably even to facilitate maintaining orthogonality with a squarewave (b) excitation, and also must be a multiple of the number of (a) phases, i.e. three. Thus the number of poles/stator coils should be 2×3×N where N is any integer. In this case it is substantially just as easy to produce a 12-phase excitation from switching transistors as a lower number of phases, so a number of (b) phases equal to the number of stator coils may as well always be used.

A 12-phase excitation has not only the property that $$L1+L2+L3+L4+L5+L6+L7+L8+L9+L10+L11+L12=0 \quad (1)$$

but also the properties that $$L1+L7=L2+L8=L3+L9=L4+L10=L5+L11=L6+L12=0 \quad (2)$$

$$L1+L3+L5+L7+L9+L11=0 \text{ and } L2+L4+L6+L8+L10+L12=0 \quad (3)$$

$$L1+L4+L7+L10=L2+L5+L8+L11=L3+L6+L9+L12=0 \quad (5)$$

and $$L1+L5+L9=L2+L6+L10=L3+L7+L11=L4+L8+L12=0 \quad (6)$$

but this latter property is true only for modified squarewaves, while properties (1) to (5) hold for unmodified squarewaves.

FIG. 10 uses the property of equation (5) above to maintain orthogonality between the (a) and the (b) excitations when the (b) excitation consists of square waveforms. It may be seen that the coils receiving L1(b), L4(b), L7(b) and L10(b) excitation at their outer ends are connected at their inner ends (by the solid connecting lines) to the L1(a) excitation. This is in effect a neutral point for the 4-phase excitation L1(b), L4(b), L7(b), L10(b) and thus no (b) excitation is coupled to L1(a). Likewise the dashed connecting lines couple L2(b), L5(b), L8(b)L11(b) to L2(a) and the dotted connecting lines couple L3(b), L6(b), L9(b)L12(b) to L3(a).

As the (a) excitation repeats four times around the stator coils, the rotation speed is ¼ that of the (a) excitation frequency, namely 900 RPM for 60 Hz The (b) excitation only has one cycle around the stator coils so the (b) excitation frequency must therefore be 900 RPM/60 seconds=15 Hz.

The (a) excitation may be a WYE or DELTA connection to a 3-phase utility supply, and no (b) excitation current now flows in the utility service drop transformers, so they do not need to be over-dimensioned.

When adjacent stator coil windings overlap as in FIG. 8, the mutual coupling between coils due to overlap is constructive to the magnetic field when adjacent phases of an excitation are less than 90 degrees apart. This pertains when using the alternative arrangement of FIG. 11. In FIG. 11, the 3-phase utility connection uses split-phase service drop transformers for each phase to obtain phase and phase+180 degrees, making 6 phases in total. This provides a 6-phase (a) excitation with 60 degrees difference between adjacent coils. Orthogonality with the (b) excitation relies upon equation (2) above; opposite pairs of coils, such as those excited out of phase at their outer ends by L1(b), L7(b), are connected together at their inner ends to the zero-phase (a) excitation L1(a). The −L1(a) excitation from the other phase of the L1(a) utility transformer has a phase of 180 degrees and is connected to the inner ends of the coils which are excited at their outer ends by L4(b), L10(b). The other coils are similarly connected to the L2(a) and L3(a) utility transformers such that the (a) excitation produces the phase progression 0, 60, 120, 180, 240, 300 repeating twice around the stator. The rotation speed is thus 1800 RPM when the (a) excitation frequency is 60 Hz, so the 12-phase (a) excitation, which repeats only once around the stator, must then be 30 Hz plus the necessary slip rate. As with FIGS. 9 and 10, no (b) excitation current flows in the utility transformer windings, so they need not be over-dimensioned; however current delivered to the utility transformers when the machine is generating also flows in the switching transistors that produce the (b) excitation, so the transistors must be sized accordingly to handle both the (b) current and some of the (a) current.

When the (b) current is derived from a solar array, no overcurrent protection on the (b) excitation side of the machine is necessary, as solar arrays are current limited; overcurrent protection on the (a) side may appropriately be provided by using a 2-pole breaker on the 240 volt connections to each of the utility transformers (1010). It is immaterial if one of these two-pole breakers trips and not the other two. The machine will continue to deliver current to the remaining two phases as long as it does not exceed their breaker ratings. If two 2-pole breakers trip, the machine will still function as a single phase generator and 12 pole motor.

For completeness, FIG. 13 shows how the same 12-pole machine of FIGS. 10 and 11 can be connected to a single split-phase utility transformer, relying upon equation (3) to maintain orthogonality between the (a) and (b) excitations.

In FIG. 13, the odd numbered stator coils have their inner ends connected to the 0-degree leg of the utility service drop transformer (1010) while the 180-degree leg connects to the inner ends of the even numbered coils. A two phase (b) excitation (0, 180) is thus produced which repeats 6 times around the stator. The rotation frequency is thus 60 Hz×60 Seconds/6=600 RPM. In this case the (b) excitation is a 12 phase signal at 10 Hz.

It will be appreciated that, when there is a ground connection on the machine side of the utility transformers, DC input 2020 of FIG. 4 must be floating to allow it to supply equal positive and negative currents to the stator coils. A floating solar array is contemplated as the DC source, as was also a feature of the invention described in U.S. Pat. No. 8,937,822 to current inventor, which is incorporated by reference herein. In the '822 patent, it is described how ripple that can be a harmonic of the switching frequency can appear as a common mode signal on the array DC lines, and this can also arise in the current invention. Such a ripple, if a consistent waveform, can be useful in detecting ground leaks on the DC side. In the above-incorporated Application, the design of common-mode filters to prevent the export of switching transients is also described, and this can be part of filter 2010 of FIG. 4.

FIG. 4 can be expanded by adding further switching transistor pairs such as (Q1, Q4) to provide as many phases as desired, such as the 12 phases for FIGS. 10, 11 and 13. Multiple phases of a squarewave may be produced by starting with a clock frequency that is a multiple of the desired excitation frequency F(b) times the number of phases N. For example, a clock frequency of 2NF(b) is suitable. This frequency is first divided by N to produce 2F(b) and then divided by 2 to produce a squarewave at F(b) with accurate 50/50 mark-space ratio. The squarewave is then delayed in a shift register clocked at NF(b) to produce squarewaves delayed by multiples of 1/Nth of a cycle. It may also be mentioned that two-level waveforms other than squarewaves can be used; for example Pulse Width Modulated waveforms, which preferably comply with whichever of equations (1) to (6) above is being relied upon for orthogonality between excitations (b) and (a)

F(b) is the frequency of the (b) excitation and must be slightly faster, by a determined amount dF, than an integral multiple or sub-multiple of the grid frequency in order to transfer power from the DC source to the grid, the amount of power transferred being proportional to dF. Either analog circuits, such as a voltage controlled oscillator, or digital circuits, such as a Direct Digital Frequency Synthesizer, may be used to produce the frequency 2NF(b) from which F(b) can be derived as described above, and to control it to achieve the desired slip frequency dF.

Increasing the slip frequency increases the current drawn from the DC source. When the DC source is a solar array, an increase in current drawn causes the voltage to fall, but there is an optimum current Imp and corresponding voltage Vmp at which the array delivers its maximum power Vmp×Imp. Control circuit (2000) of FIG. 4 thus may be designed to control the frequency while monitoring the array voltage and/or current until it is operating at the maximum power point approximately. The maximum power point voltage Vmp is not very dependent on illumination level but is more dependent on temperature. A temperature sensor can be used along with a prestored curve of Vmp versus temperature to determine the target operating point. Other methods can be used, for example providing one extra solar cell that is monitored by a pilot circuit that sweeps the V/I curve of the extra cell to determine Vmp for that cell. This is then scaled by the number of cells in an array string to determine what Vmp should be for the array. Such maximum power point tracking operates continuously to adapt to changes in illumination caused by clouds passing over. Of course there are many elements of a complete practical installation that have not been described in detail as they are immaterial to the invention; for example, appropriate overcurrent protection devices should be used and metering of the power delivered to the grid would be included for financial accounting purposes. It is also known that, due to the high inertia of big machines, starting or spin-up arrangements may be needed to avoid excessive starting currents. In the current invention, spin up may be advantageously done by powering the machine from the solar array alone, with the utility disconnected. When the machine is up to speed, the utility power may first be connected through a resistive elements such as lamps and if everything seems to be working normally, the lamps are then shorted out. Alternatively the machine may be spun-up using utility power with the aid of any of the prior art large motor starting arrangements.

Many other variations and adaptations of the invention described above can be devised. For example, two or more smaller machines can be operated together using the same or separate DC sources and their outputs both fed to the grid. Moreover, their shafts can be coupled or not, to achieve different attributes. For example, two machines of the FIG. 3 type with or without coupled shafts can be operated from separate switching circuits (1000) that are 180 degrees out of phase, thereby cancelling the (b) excitation current fed to the utility transformers (1010), which do not then need to be over-dimensioned. An arrangement of two or more machines with coupled shafts and appropriately-phased(b)-excitations may also be used to cancel some current waveform distortions that can arise due to magnetic material saturation.

It was also mentioned that the low switching rate needed for the (b) excitation can in some cases lend itself to the use of mechanical switches rather than transistors. Such variations, including variations in the number of poles, stator winding slots, rotor winding slots and excitation phases that may be devised using the teachings herein fall within the scope of the claimed invention as described by the attached claims.

I claim:

1. A rotary electrical machine for transferring electrical power from a Direct Current (DC) power source to an Alternating Current (AC) electricity grid, comprising:
   an induction motor driven from said DC source by a polyphase switching circuit to produce rotation of the rotor; and
   an induction generator coupled to said electricity grid to transfer power to said AC electricity grid;
   wherein said induction motor and said induction generator use the same stator, the same stator coils and the same rotor, the stator coils being coupled in a first mode to receive power from said polyphase switching circuit and being coupled in a second mode to deliver power to the AC electricity grid, the first and second coupling modes operating simultaneously in steady-state, and being mutually orthogonal.

2. The rotary electrical machine of claim 1 wherein said polyphase switching circuit generates a first number of phases N and the connection to said electricity grid provides a second number of phases M, and the number of said stator coils is a multiple of both N and M.

3. The rotary electrical machine of claim 1 wherein said polyphase switching circuit produces a number of square-wave drive voltage waveforms which are equispaced in phase and having a frequency that is approximately a multiple of or a sub-multiple of the frequency of said electricity grid, said stator coils being connected to the polyphase drive voltages in a first way and to said electricity grid in a second way such that no current at the squarewave drive frequency is injected into the electricity grid.

4. The rotary machine of claim 1 in which said DC power source is a photovoltaic solar array.

5. The rotary machine of claim 1 in which said polyphase switching circuit is controlled to produce polyphase drive signals of a controlled frequency slightly higher than a multiple of or a sub-multiple of the frequency of said electricity grid, the frequency being controlled to optimize the power transferred from said DC source to said electricity grid.

6. The electrical rotary machine of claim 1 in which said DC source is electrically floating.

7. The rotary electrical machine of claim 1 wherein:
said stator comprises a stator lamination stack of magnetic material;
said rotor is disposed within said stator and free to rotate on bearings; and
said stator coils comprise a number N of stator coil windings disposed at regular angular spacings within slots in said stator lamination stack;
wherein the stator coils are excited in said first mode by a polyphase electrical excitation having a phase increment of M1×360/N degrees and in said second mode by a polyphase electrical excitation having a phase increment of M2×360/N degrees and integers M1 and M2 are chosen such that electrical coupling between the first and the second polyphase excitations is substantially zero.

8. The rotary electrical machine of claim 7 in which said first polyphase excitation uses two-level waveforms and said second polyphase excitation uses sinusoidal waveforms.

9. The rotary electrical machine of claim 7 in which said first polyphase excitation is produced by said polyphase switching circuit, which connects one end of each of said stator coils alternately to the negative or the positive line of a DC source in a predetermined pattern.

10. The rotary electrical machine of claim 7 in which N is an odd integer and said first polyphase excitation comprises 3-level electrical waveforms.

11. The rotary electrical machine of claim 1 wherein said polyphase switching circuit is operative to generate a set of non-sinusoidal motor drive waveforms which are relatively time-shifted by sub-multiples of their repetition period.

12. The rotary electrical machine of claim 11 wherein said induction generator is coupled to said electricity grid to transfer power to said AC electricity grid by connecting said same stator coils to one or more service drop transformers connected to said electricity grid.

13. The rotary electrical machine of claim 12 wherein said same stator coils are connected to one or more service drop transformers by connecting one end of each of a subset of said stator coils to a hot leg of a utility transformer and the other end of each of said subset of stator coils is driven by a respective one of said non-sinusoidal motor drive waveforms, wherein the set of non-sinusoidal motor drive waveforms that drive said subset of stator coils has the property that their sum is nominally zero at all times during each cycle.

14. The rotary electrical machine of claim 11 wherein the repetition frequency of said non-sinusoidal drive waveforms is slightly higher than an integer multiple of the frequency of said electricity grid by a controlled slip rate.

15. The rotary electrical machine of claim 11 wherein the frequency of said non-sinusoidal drive waveforms is slightly higher by a controlled slip rate than the frequency of said electricity grid divided by an integer.

16. The rotary electrical machine of claim 1 wherein said energy source comprises a photovoltaic array.

17. The rotary electrical machine of claim 1 wherein said energy source comprises one or more batteries charged by a photovoltaic array.

* * * * *